(No Model.)
A. A. INGRAHAM.
ELECTRICALLY PROPELLED VEHICLE.
No. 428,917. Patented May 27, 1890.
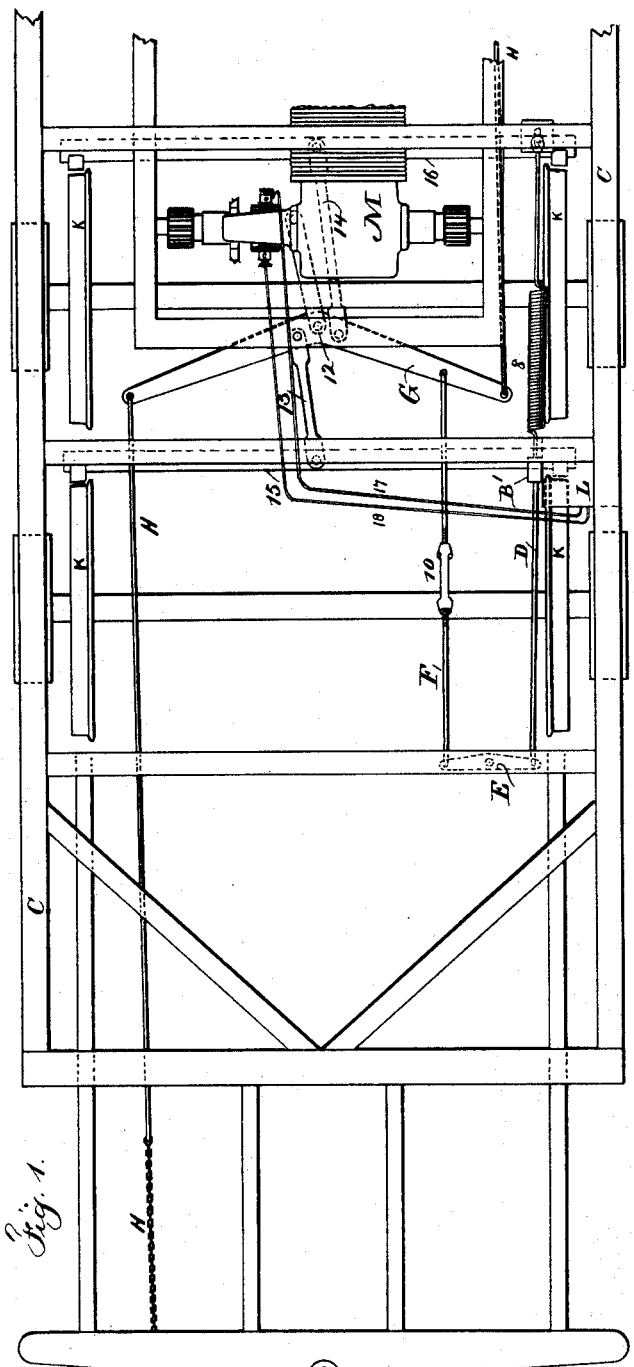
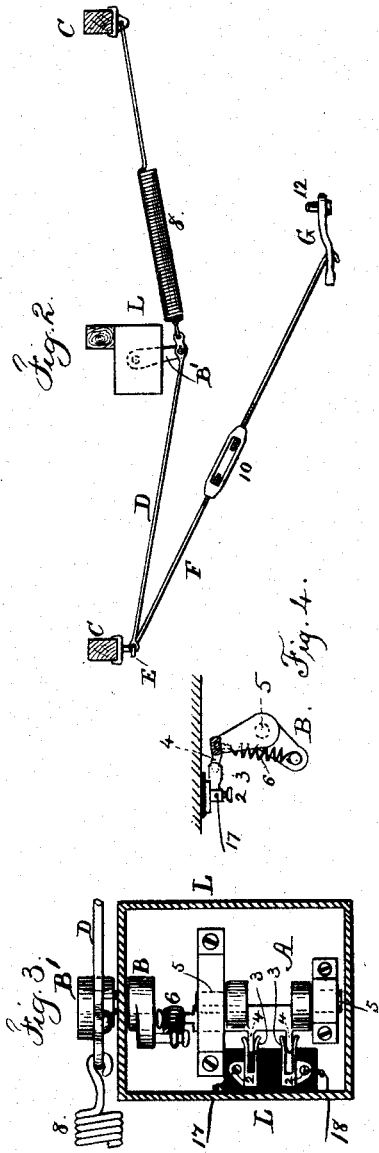
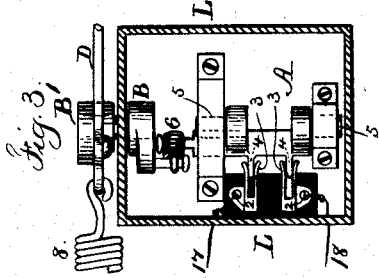
Witnesses
Chas H. Smith
J. Staib
Inventor
Arnold A. Ingraham
per Lemuel W. Serrell
atty
THE NORRIS PETERS CO., PHOTO-LITHO., WASHINGTON, D. C.

UNITED STATES PATENT OFFICE.

ARNOLD A. INGRAHAM, OF NEW YORK, N. Y.

ELECTRICALLY-PROPELLED VEHICLE.

SPECIFICATION forming part of Letters Patent No. 428,917, dated May 27, 1890.

Application filed August 16, 1889. Serial No. 320,971. (No model.)

*To all whom it may concern:*

Be it known that I, ARNOLD A. INGRAHAM, of the city and State of New York, have invented an Improvement in Electrically-Propelled Vehicles, of which the following is a specification.

The object of this invention is to break the circuit to the electric motor by the action of the brake mechanism, and this is effected by the combination, with such brake mechanism, of a switch for interrupting the electric circuit, and a connection between the switch and the brake that is adjusted in order that the electric circuit may be broken immediately before the brakes are applied, so that the car may be allowed to run downhill and the brake put on more or less, as necessary, for regulating the speed of the car without affecting the circuit-closing devices, and such circuit-closing device is brought into action automatically only when the brake is entirely released from the wheels.

In the drawings, Figure 1 is a diagrammatic plan view illustrating the present invention. Fig. 2 is an elevation, partially in section, representing the connections between the brake and the switch; and Fig. 3 is an inverted plan of the switch. Fig. 4 is a detached sectional view of the switch.

The switch A is made with binding-screws 2 for the circuit-wires 17 and 18 to the electric motor M, and there are springs 3 and vibrating contacts 4, that are supported upon crank-arms with gudgeons 5, and there is a lever-arm B, from which the contractile spring 6 extends to one end of the crank-arm, carrying the vibrating contacts 4. When this arm B stands in its normal position, the spring 6 draws the vibrating contacts 4 firmly against the springs 3 and closes the circuit. When the arm B is swung into the opposite position, the spring 6 does not act to move the contacts 4 until after the arm B passes the end of the gudgeon 5, and then such spring 6 acts suddenly and pulls the contacts 4 away from the springs 3.

The parts of the switch are preferably within a box L, and the arm B might extend out through a slot in the box; but in order to make the box dust-proof the arm B, within the box, is connected by a shaft to the arm B', outside the box.

To combine this quick-acting switch with an electric motor and brake upon a railway-car, I connect the box L, containing this switch A, upon a convenient portion of the car-frame C, and provide a contractile spring 8 between one end of the lever B' and frame C, and this spring serves to hold such lever B' with the contacts 4 against the springs 3, and at the other side of the lever-arm B' is a rod D, that is connected with the brake mechanism, preferably through the rocking lever E, rod F, and turn-buckle 10, or similar adjusting device to the brake-lever G.

The brake mechanism may be of any desired character. I have shown the lever G as pivoted at 12, and acted upon by the rod and chain H to the brake-shaft and handle I, and at 13 and 14 are the rods connecting the lever G with the brake-beams and brakes 15 and 16 to the car-wheels K.

It will be now apparent that when the brake mechanism hangs loosely the spring 8 retains the lever B in such a position that the electric circuit is closed between 3 and 4 and the electric motor is made to operate; but when the brake mechanism is applied and the lever G moves the rod F and the turn-buckle 10 the rocking lever E and rod D move the lever-arm B', so that the circuit is broken by the action of the spring 6 before the brake-blocks are applied to the wheels. Hence the electric motor can be thrown out of action and the switch reliably held while more or less pressure is applied by the brake-blocks to the wheels, thus allowing the car to run by gravity whenever the track is sufficiently inclined; or the car can be stopped without injury to the electric switch, because the spring 6 yields to whatever movement may be given to the lever-arm B; but as soon as the brake mechanism is liberated the spring 8, acting upon the lever-arm B, moves such arm, and the spring 6, acting suddenly upon the contacts 4, brings them against the springs 3, and the electric circuit to the motor is thereby closed.

I do not claim, broadly, a switch operated automatically in connection with the brake mechanism of cars, as this has before been used.

I claim as my invention—

The combination, with the brake mechanism in the car, of a circuit-closing switch, a lever-arm, and a spring intervening between the same and the circuit-closing switch for moving the switch suddenly in one direction or the other, a connection between the lever-arm and the brake mechanism, and a turnbuckle or adjusting mechanism for regulating the action of the electric switch in its relation to the brake mechanism, substantially as set forth.

Signed by me this 13th day of August, 1889.

ARNOLD A. INGRAHAM.

Witnesses:
 GEO. T. PINCKNEY,
 WILLIAM G. MOTT.